US006588366B1

(12) United States Patent
Ranson et al.

(10) Patent No.: US 6,588,366 B1
(45) Date of Patent: Jul. 8, 2003

(54) PET BED

(76) Inventors: Laurel C. Ranson, P.O. Box 225, Candlewood Isle, Newfairfield, CT (US) 06812; Dave Romanchik, P.O. Box 296, Candlewood Isle, New Fairfield, CT (US) 06812

( * ) Notice: Subject to any disclaimer, the term of this patent is extended or adjusted under 35 U.S.C. 154(b) by 0 days.

(21) Appl. No.: 10/217,888

(22) Filed: Aug. 13, 2002

(51) Int. Cl.[7] ............................................. A01K 29/00
(52) U.S. Cl. ................................. 119/28.5; D30/118
(58) Field of Search ................... 119/28.5; D30/118, D30/120

(56) References Cited

U.S. PATENT DOCUMENTS

| | | | | |
|---|---|---|---|---|
| 2,980,058 A | * | 4/1961 | Hoffman | 119/28.5 |
| 5,161,484 A | * | 11/1992 | Duane | 119/28.5 |
| 5,213,060 A | * | 5/1993 | Sloan et al. | 119/28.5 |
| 5,709,164 A | * | 1/1998 | Batterton | 119/28.5 |
| 6,286,456 B1 | * | 9/2001 | Michaelis | 119/28.5 |
| D460,222 S | * | 7/2002 | DeRaspe-Bolles et al. | D30/118 |

* cited by examiner

*Primary Examiner*—Charles T. Jordan
*Assistant Examiner*—Elizabeth Shaw

(57) ABSTRACT

Pet Bed with a tray member having rigid side walls and a flat D shaped bottom. The tray member contains a downwardly disposed rotator post attached to its underside. A support tube accepts the rotator post. A horizontal base having an integral upwardly disposed vertical socket retains the tube. The tray has a horizontally disposed plate extending from the straight side of the D shape and is capable of being inserted between the mattress and box spring of a standard person's bed. A cloth covered foam insert lines the inside walls and floor of the tray. A flat heating pad is placed between the tray base and the underside of the poly foam insert. The rotator post has a flange at its upper most portion. The rotator post is capable of rotating within the support tube so that the attached tray can swing out and away from a person's bed.

2 Claims, 4 Drawing Sheets

PET BED

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of pet beds and more specifically to a pet bed that is designed to be located in very close proximity to a person's bed. Pet beds for dogs and cats and the like have become popular in the marketplace. These beds are often constructed of poly foam material covered with a fabric. Pet beds traditionally have a base and a continuous side wall that is attached to the base forming a soft tray type construction. Some of the current pet beds also include the option of inserting a heating pad between the pad that the animal lays on and the base of the foam tray. However, many pets would prefer to sleep in-close proximity to their human owners, meaning actually sleeping on the pet owner's bed. When this occurs, many times the human owners are forced to sleep in uncomfortable positions to accommodate their pets snuggling activity. This condition can result in a disruption of the pet owner's sleep. There is a need therefore, for a pet bed that can be in close proximity to the top surface of the pet owner's bed and which can be easily swung away when the person wishes to exit or enter his or her bed.

BRIEF SUMMARY OF THE INVENTION

The primary object of the invention is to provide a pet bed that can be placed in close proximity and height to the top surface of a bed used by the pet owner.

Another object of the invention is to provide a pet bed that can be easily swung away when the person wishes to exit the bed.

Another object of the invention is to provide a pet bed that includes a heating pad within it.

A further object of the invention is to provide a pet bed whose height is adjustable.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a pet bed comprising a tray member having rigid side walls and a flat D shaped bottom. The tray member has a downwardly disposed rotator post attached to its underside. A support tube accepts the rotator post. A horizontal base and integral upwardly disposed vertical socket retains the support tube. The tray has a horizontally disposed plate extending from the straight side of said D shape and capable of being inserted between the mattress and box spring of a standard person's bed. The support tube has a plurality of vertically disposed apertures and the base socket has a threaded screw and attached tightening knob so that the height of said support post can be adjusted by the user. A cloth covered poly foam insert lines the inside walls and floor of said tray. A flat heating pad is placed between the tray base and the underside of the poly foam insert. A line cord and associated plug is attached to the heating pad. The rotator post has a flange at its upper most portion. A flange retaining ring helps connect the rotator post flange to the underside of the tray. The rotator post is capable of rotating within the support tube so that the attached tray can swing out and away from the close proximity of a person's bed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
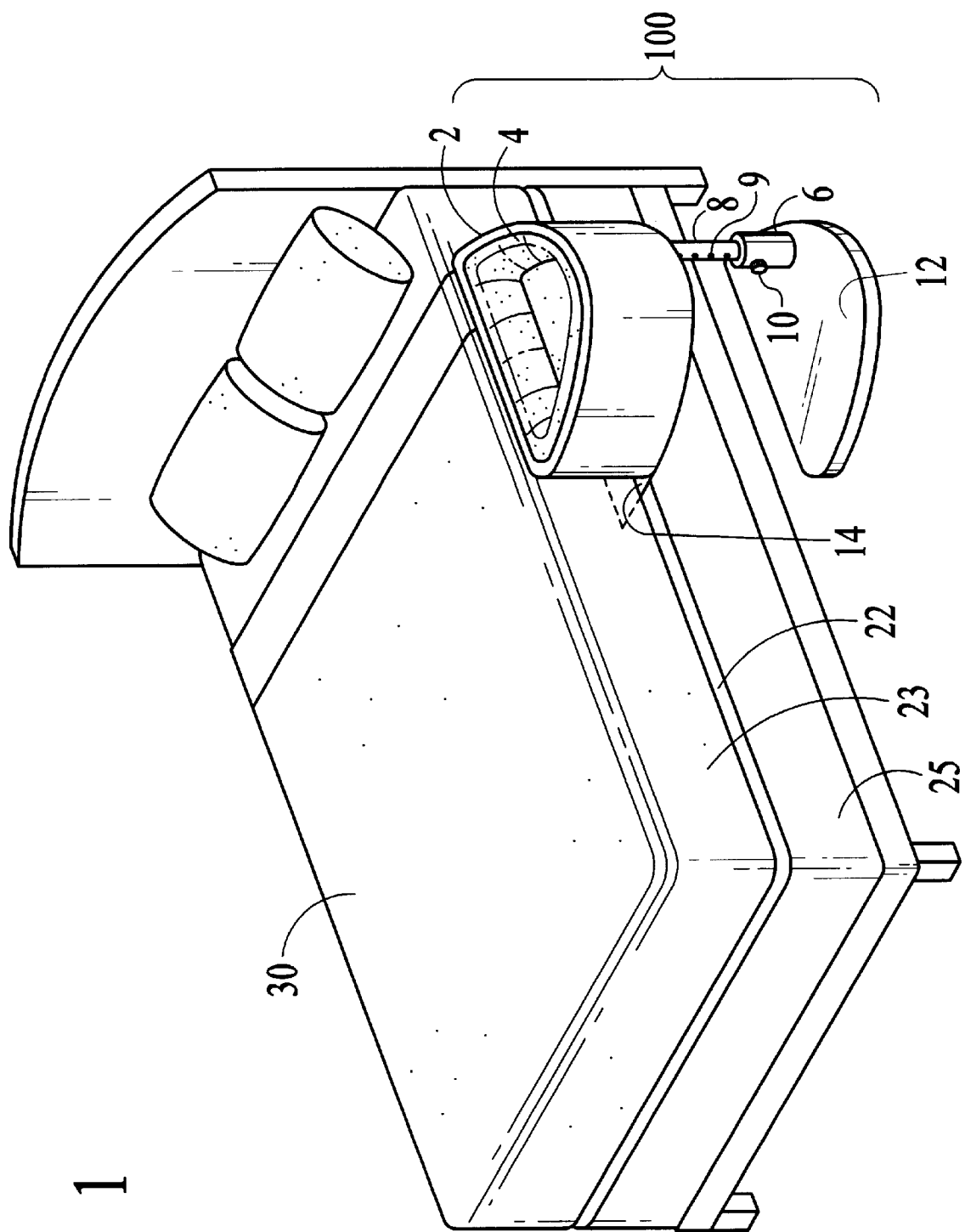
FIG. 1 is a perspective view of the invention in the use position.
Figure 2:
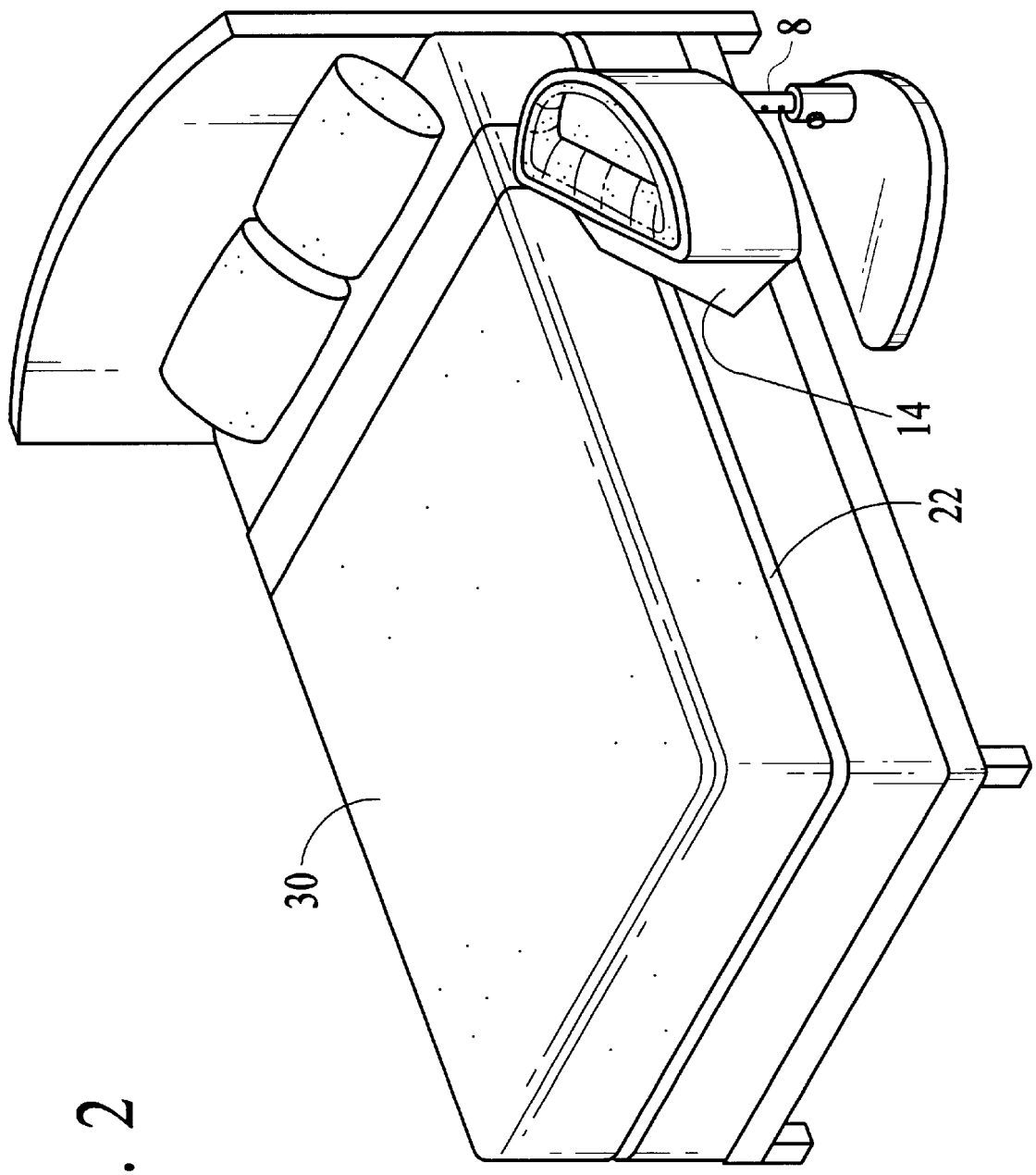
FIG. 2 is a perspective view of the invention in the swung away position.
Figure 3:
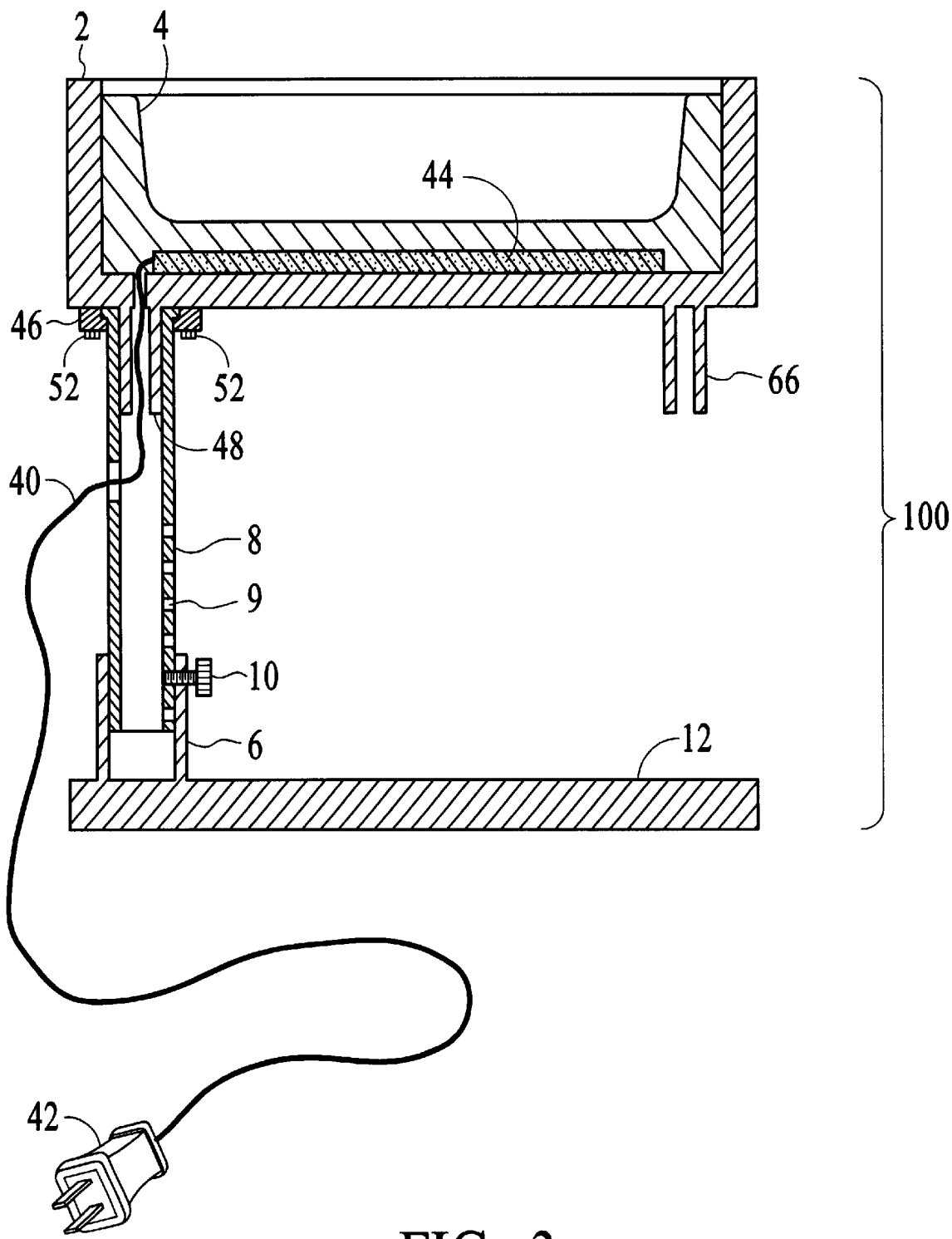
FIG. 3 is a side section view of the present invention.
Figure 4:
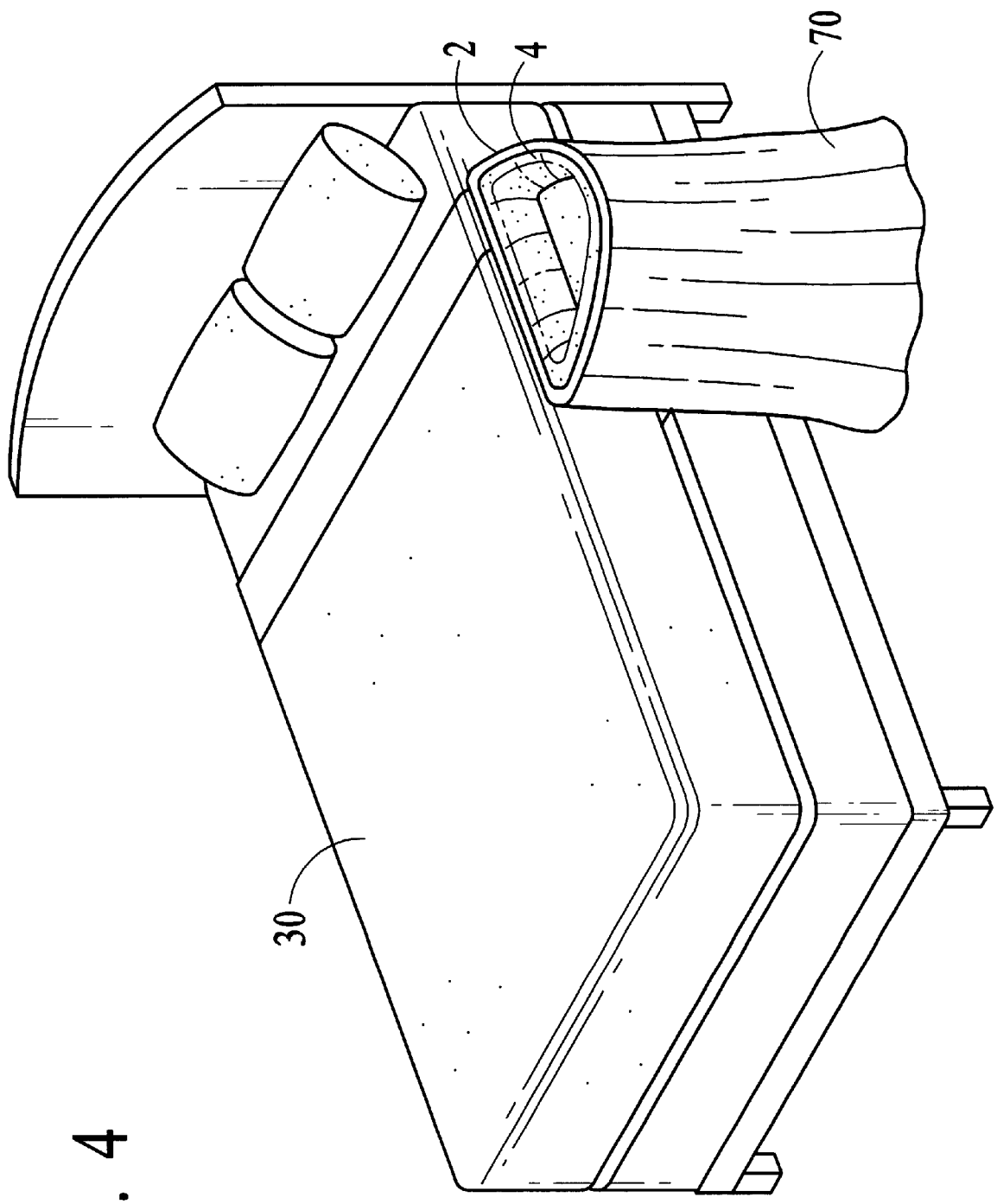
FIG. 4 is a perspective view of the present invention having a decorative skirt.

Referring now to FIG, 1 we see a perspective view of the pet bed of the present invention 100 and its relationship to a standard human bed 30. A D shaped tray member 2 holds a cloth covered poly foam insert 4 that is comfortable for a pet to sleep in. The flat portion of the D shape can abut the side of a bed 30 so that the pet can be in close proximity to the person sleeping in the bed 30. In this way the pet is encouraged to sleep in the pet bed rather than in the human bed 30 thereby allowing the person or persons sleeping in bed 30 to not be disturbed by the pet and to have a peaceful nights sleep. An integral plate 14 is attached to tray member 2 and can slide into the space 22 between mattress 23 and box spring 25 and helps support the tray member 2. Tray support tube 8 inserts into base 12 support tube 6. A plurality of apertures 9 in tube 8 interface with a screw and knob assembly 10 to allow the tray tube height to be adjusted so that the top lip of tray 2 is level with the top of mattress 23 thereby giving the pet the impression that he or she is sleeping on bed 30. It should be noted that although the preferred embodiment describes a D shaped plan view of the tray, other shapes may be used including an oblong shape and a rectangular shape. FIG. 2 shows a perspective view of the invention in the swung out position thereby allowing a person to easily exit or enter the bed 30. The tray member can rotate about support tube 8 thereby allowing the tray to swing away from bed 30. Integral plate 14 is clearly seen and is ready to swing into the space 22 to help support the tray 2. FIG. 3 is a side section view of the pet bed of the present invention 100. Tray 2 is made of rigid material such as molded plastic or the like. Cloth covered poly foam insert 4 provides a soft surface for the pet to sleep on. Heater pad 44 warms the floor of insert 4 so that the pet will experience the type of warmth that is usually experienced when sleeping next to a human. Line cord 40 and plug 42 connect the heating pad 44 to household voltage. The bottom of tray 2 has a downwardly disposed integral tube 48 that retractably inserts into tray support tube 8. A flange on the top of tray support tube 8 is retained by flange retainer 46 and attached by screws 52. If the user wants to have the tray swing from the opposite side of the tray, they can attach tray support tube 8 to integral tube 66. Support tube 8 is fastened to base tube 6 by screw and knob assembly 10. A plurality of apertures 9 allow the user to adjust the height of tray 2 so that the top lip of tray 2 is even with the top surface of bed 30. Base 12 is a similar D shape and constructed of heavy rigid material such as powder coated steel or painted partial board thereby providing a stable support for tray 2. FIG. 4 shows an additional cloth skirt 70 that can be attached to the perimeter of the tray 2. The skirt 70 can coordinate with a bed spread to create a more integrated look between the bed 30 and the pet bed 100.

The above description and illustrations show a novel pet bed that allows a pet to sleep in close proximity to its owner without actually sleeping on the owner's bed. The pet bed can be easily swung out of the way when the pet owner wishes to exit or enter the bed.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Pet bed comprising:

a tray member having rigid side walls and a flat D shaped bottom;

said tray member having a downwardly disposed rotator post attached to the underside of said tray bottom;

a support tube that accepts said rotator post;

a horizontal base having an integral upwardly disposed vertical socket for retaining said tube;

said tray having a horizontally disposed plate extending from the straight side of said D shape and capable of being inserted between the mattress and box spring of a standard person's bed;

said post having a plurality of vertically disposed apertures and said base socket having a threaded screw and attached post tightening knob so that the height of said support post can be adjusted by the user;

a cloth covered poly foam insert that lines the inside walls and floor of said tray;

a flat heating pad that is placed between said tray base and the underside of said poly foam insert;

a line cord and associated plug attached to said heating pad;

said rotator post having a flange at its upper most portion;, a flange retaining ring to help connect said rotator post flange to the underside of said tray; and said rotator post capable of rotating within said support tube so that the attached tray can swing out and away from the close proximity of a person's bed.

2. Pet bed as claimed in claim 1 wherein a cloth skirt is attached to said side walls of said tray, said skirt reaching the floor.

* * * * *